United States Patent
Andersson et al.

(10) Patent No.: US 8,842,084 B2
(45) Date of Patent: Sep. 23, 2014

(54) GESTURE-BASED OBJECT MANIPULATION METHODS AND DEVICES

(75) Inventors: Ola Andersson, Spånga (SE); Michael Huber, Sundbyberg (SE); Johan Kwarnmark, Hässelby (SE); Johan Svedberg, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 284 days.

(21) Appl. No.: 13/227,728

(22) Filed: Sep. 8, 2011

(65) Prior Publication Data

US 2012/0062489 A1    Mar. 15, 2012

Related U.S. Application Data

(60) Provisional application No. 61/380,769, filed on Sep. 8, 2010.

(51) Int. Cl.
*G06F 3/041* (2006.01)

(52) U.S. Cl.
USPC .......................................... 345/173; 345/179

(58) Field of Classification Search
USPC ................................................ 345/173–178
See application file for complete search history.

(56) References Cited

U.S. PATENT DOCUMENTS

| | | | |
|---|---|---|---|
| 7,339,580 B2 | 3/2008 | Westerman et al. | |
| 7,728,823 B2 | 6/2010 | Lyon et al. | |
| 2010/0020025 A1* | 1/2010 | Lemort et al. | 345/173 |
| 2011/0163968 A1* | 7/2011 | Hogan | 345/173 |
| 2011/0181524 A1* | 7/2011 | Hinckley et al. | 345/173 |

OTHER PUBLICATIONS

Villamor et al., Touch Gesture—Reference Guide; Apr. 15, 2010; pp. 1-7.

* cited by examiner

*Primary Examiner* — Robin Mishler
(74) *Attorney, Agent, or Firm* — Nixon & Vanderhye P.C.

(57) ABSTRACT

Gesture based control of objects displayed on touch screen displays is described. An object is displayed on a touch screen display, and a first touch operation is detected at a first position on the display. The first position is within an area that is associated with the displayed object. A second touch operation is detected within the area. After detecting the first and second touch operations another, a third touch operation is detected at a third position. A distance between the third position and the first position is calculated. When the distance is greater than a predetermined value, a copy of the object is displayed on the touch screen display.

16 Claims, 10 Drawing Sheets

GESTURE-BASED OBJECT MANIPULATION METHODS AND DEVICES

CROSS-REFERENCES TO RELATED APPLICATIONS

This application claims priority to U.S. Provisional Application No. 61/380,769, filed Sep. 8, 2010, the entire content of which is hereby incorporated by reference.

TECHNICAL FIELD

The technology herein relates to displays on electronic devices and manipulating or controlling objects displayed thereon. More particularly, the technology herein relates to multi-touch controls on display devices and methods of duplicating objects display as part of a user interface.

BACKGROUND

Touch-screen devices and more recent multi-touch-screen devices, such as the iPad available from Apple Computer and many other types of tablets, netbooks, and other computers available from many manufacturers, have become increasingly popular. Input techniques for touch-screen devices often use dual-touch (e.g., simultaneously registering a user's two finger tips touching the screen) or multi-touch (e.g., simultaneously registering two, three, or more touches on the touch screen). The term multi-touch may be understood to include dual-touch.

A Touch Gesture Reference Guide by C. Villamor et al., available at www.lukew.com, describes gestures used for most touch commands. The guide includes information on using gestures to support user actions, visual representations of gestures, and outlines of how popular software platforms support touch gestures.

U.S. Pat. No. 7,339,580 to Westerman et al. states that it discloses apparatuses and methods for simultaneously tracking multiple finger and palm contacts as hands approach, touch, and slide across a proximity-sensing, compliant, and flexible multi-touch surface that consists of compressible cushion dielectric, electrode, and circuitry layers.

U.S. Pat. No. 7,728,823 to Lyon et al. states that it describes an input device and system that acquires raw track pad sensor data that is transmitted to a computer that analyzes it.

Figure 1A:
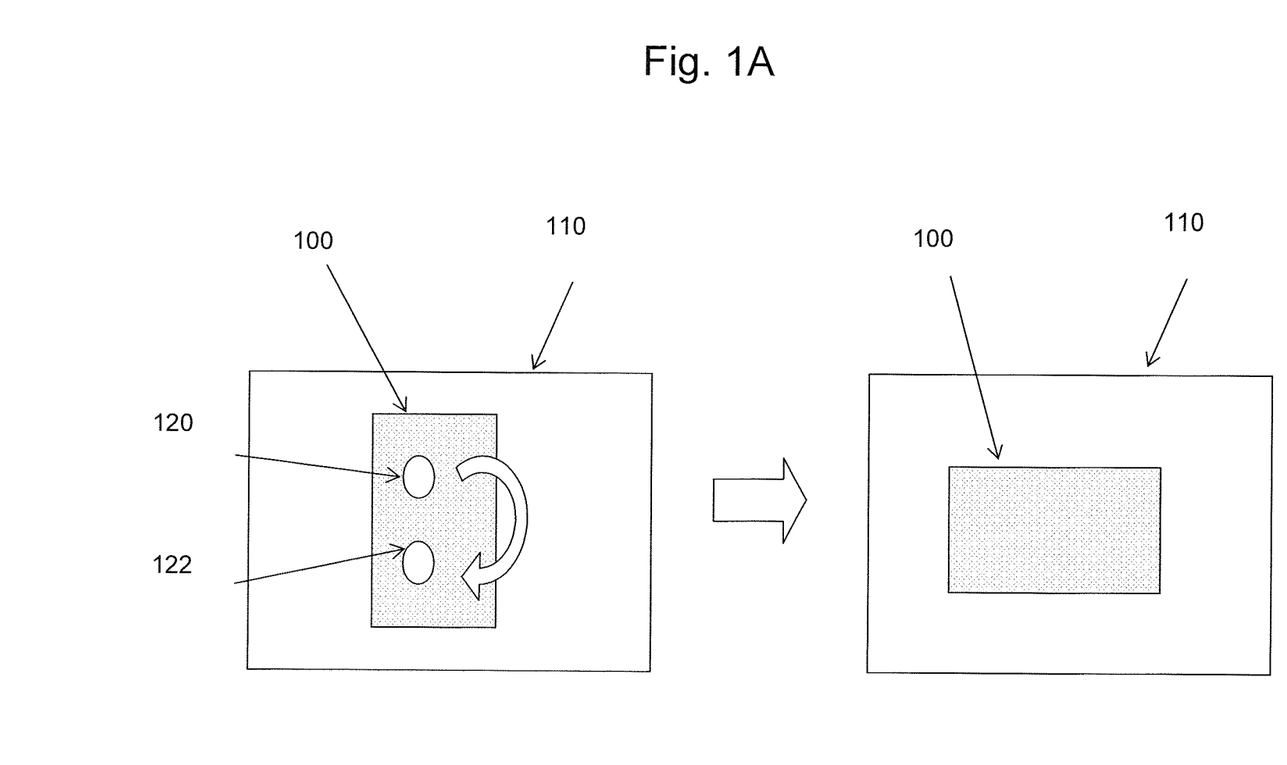
FIG. 1A depicts a gesture control for rotation of an object on a touch-screen display.
Figure 1B:
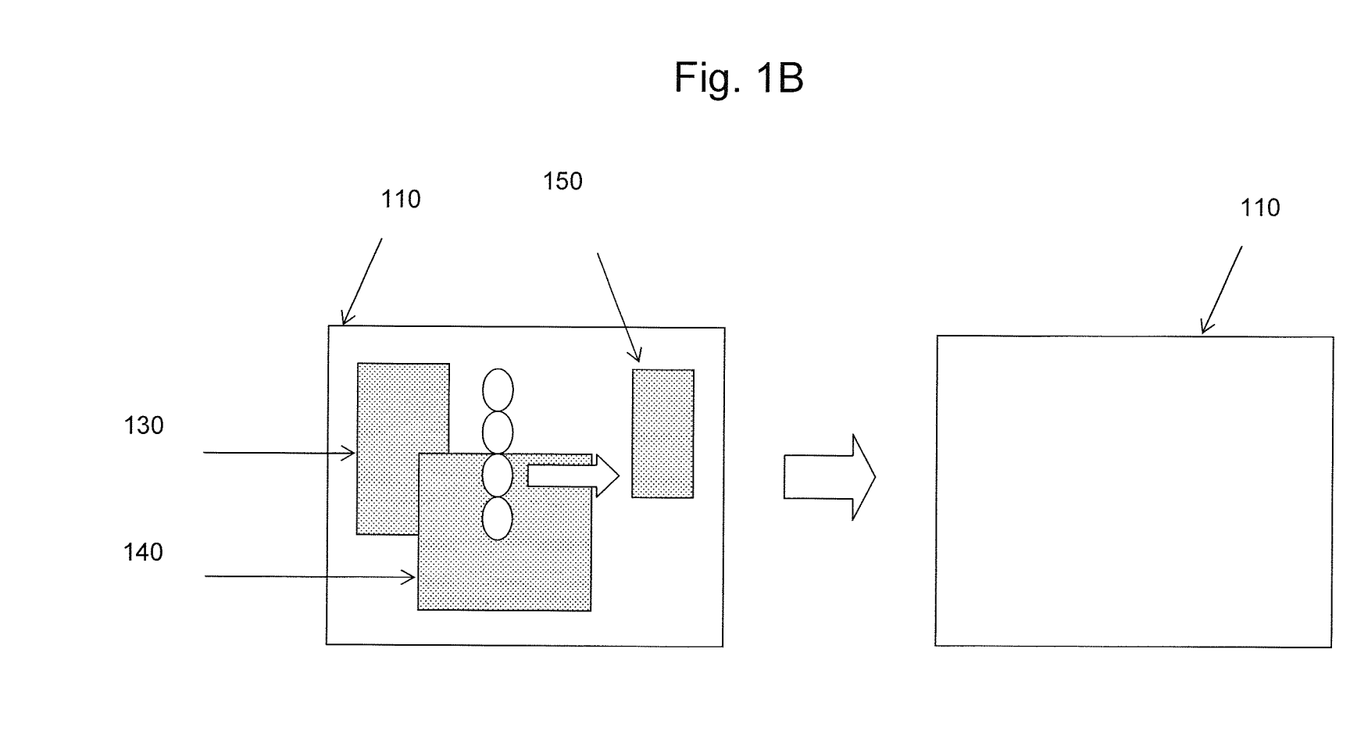
FIG. 1B depicts a gesture control for closing multiple windows on a touch-screen display.

Various uses of multi-touch are known. For example, as depicted in FIG. 1A, touching an object or icon 100 on a touch-screen display 110 with the tips of two fingers 120, 122 and rotating the finger-tips while continuing to touch the display 110 corresponds to or causes the touched object 100 to rotate accordingly, e.g., by one-quarter turn as shown. For another example, as depicted in FIG. 1B, touching the display 110 with the tips of four fingers and swiping or sliding the finger-tips while continuing to touch the display 110 corresponds to or causes hiding all open windows 130, 140, 150 on the screen 110, leaving a blank screen or desktop as shown.

Another type of touch command relates to duplicating or copying an object that is displayed on the touch screen. A typical technique of duplicating an object on a touch display is depicted in FIGS. 2A, 2B, and 2C.

Figure 2A:
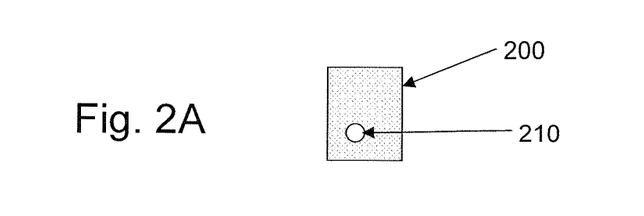
FIGS. 2A, 2B, and 2C depict a gesture control for duplication of an object on a touch-screen display.
Figure 2B:
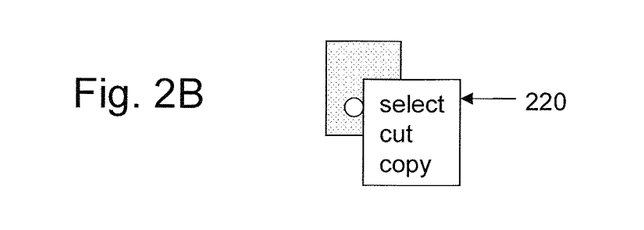
Figure 2C:
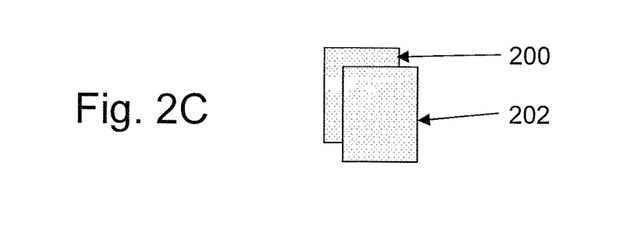

In FIG. 2A, a user presses for a period of time longer than normal on an object 200 by touching and pressing with the tip of one finger 210. In response to the long-press, and shown in FIG. 2B, a context menu 220 is displayed. From the context menu, a user may select the object, cut the object (e.g., delete and copy), or copy the object. When a user chooses the copy option, e.g., by tapping with a fingertip, a duplicate 202 of the object 200 is created.

However, such methods may be cumbersome for users seeking to copy objects via a touch screen display. It will be appreciated that new and improved techniques of user control of touch screen displays are continuously sought after.

SUMMARY

Accordingly, example embodiments herein relate to methods, apparatus, and computer-readable media having stored instructions that, when executed by a computer, cause the computer to carry out methods of copying objects, icons, or other displayed information, on a touch-screen display.

In certain example embodiments, a method is provided that operates on a processing system. The processing system is coupled to a touch screen display and a memory. A first object is displayed on the touch screen as part of a user interface. For example, the graphical user interface may be on a cellular phone, laptop, tablet device, personal computer, and the like. A user performs a first touch on the screen. This first touch is detected by the processing system and/or the touch screen within an area that is associated with the displayed first object. The user then performs a second touch which is also detected within the area associated with the first object. In an example, the first and second touches are performed simultaneously by the user (or substantially simultaneously). In other example embodiments, the first touch is before the second touch, or the second touch is performed before the first touch. A user performs a third touch that is detected. A distance between a position associated with the third touch and the position associated with the detected first touch is calculated. A copy of the displayed object is displayed on the touch screen display if the distance is greater than a predetermined value.

In some embodiments, the copy of the displayed object is display at or proximate to the third touched position. In other embodiments, the object is displayed in another predetermined location on the touch screen display.

In another example embodiment, a non-transitory computer readable storage medium is provided. Instructions stored on the medium include displaying at least one object on a touch screen. A first, second, and third touch inputs are provided that correspond to first, second, and third points on the touch screen display. The first, second, and third positions are different from one another. Based on the third position, a test is performed against one or more duplication criteria. If the test or assertion is successful, a copy of the at least one object is created and/or displayed on the touch screen.

In other example embodiments, an apparatus is provided that includes a touch screen display, a memory storage medium, and a processing system. The processing system displays an object on the touch screen display as part of a user interface. First, second, and third touch inputs are detected at respective first, second, and third positions on the touch screen display. The first and second positions are within an area that is associated with the display object. A distance is calculated between the third position and another position that is associated with the displayed object, the area associated with the object, the first position, and/or the second position. The displayed object is duplicated if the calculated distance is greater than or equal to a predetermined value. The duplicated object is displayed on the touch screen display.

In some example embodiments, an object may be selected with one touch and then copied with a second touch that is performed at another position on a touch screen. Thus, for example, the distance between the first and second touches may be used to determine when a copy command is triggered.

BRIEF DESCRIPTION OF THE DRAWINGS

These and other features and advantages will be better and more completely understood by referring to the following detailed description of exemplary non-limiting illustrative embodiments in conjunction with the drawings of which.

DETAILED DESCRIPTION

Touch screen displays provide new and interesting opportunities for providing user interfaces and the like to users. As discussed above, touch screen displays are known in the art. Example implementations of touch screens or multi-point touch screens may be found in U.S. Pat. No. 7,663,607, which is hereby incorporated by reference. Also, U.S. Patent Publication Nos. 2006/0026521; 2006/0033724; and 2007/0257890, which are hereby incorporated by reference.

Figure 3A:
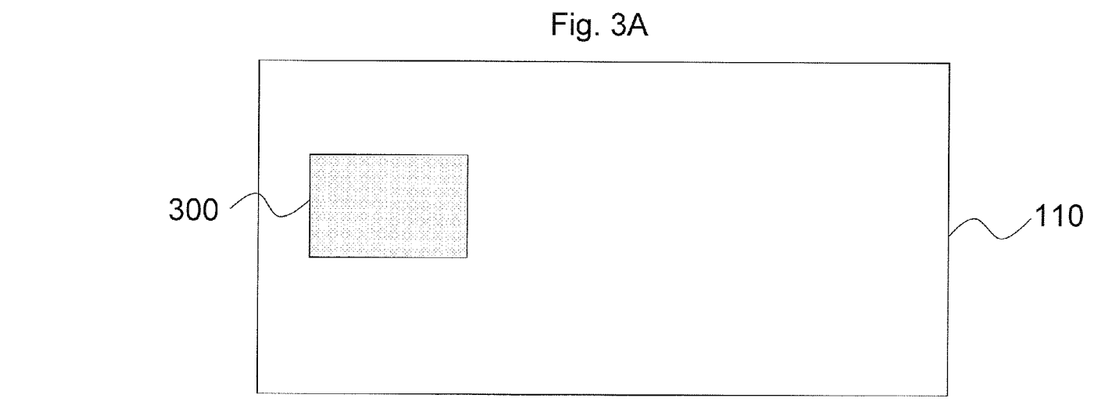
FIGS. 3A, 3B, 3C, and 3D depict an example technique for copying an object on an illustrative touch-screen display.

FIGS. 3A, 3B, 3C, and 3D depict an example technique for copying an object on a touch-screen display. FIG. 3A depicts an object 300 that is visible on a touch-screen display. The object 300 may be any type of object that can be displayed as part of a user interface. For example, the object may be a file icon, a photograph (e.g., a picture), a folder icon, a document, an email, etc.

Figure 3B:
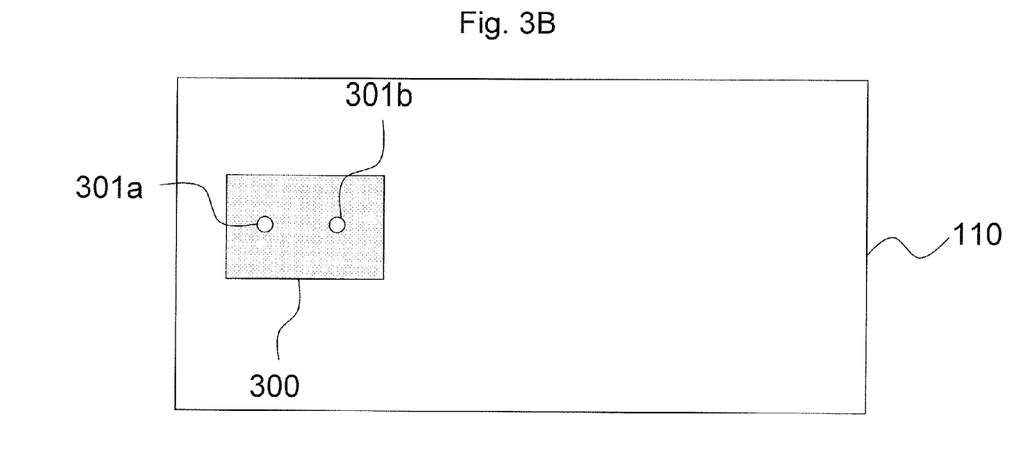

In FIG. 3B, two user touch operations are detected at positions 301a and 301b. These positions are detected by the touch screen and/or associated processor to be within the area of the screen where the object 300 is being displayed. These two point touch operations act to "select" the object 300 as the object that the user desires to duplicate. The touch operations may be a result of a user pressing a finger, a stylus, or other pointing element onto the touch screen display 110.

Figure 3C:
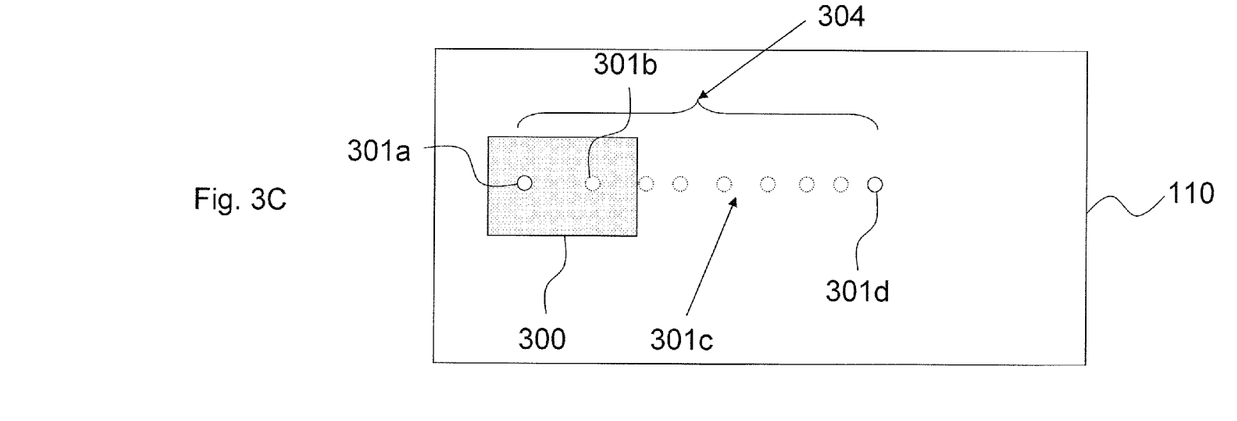

After selecting the object 300 through the two touch input operations, the user may then duplicate the object (e.g., to make a copy of a photo and put it in a separate folder) by performing another touch operation. FIG. 3C shows a technique according to an example embodiment of performing a touch operation that may facilitate the duplication of object 300. In this example, the user separates his fingers by moving from the touch position 301b to the touch position 301d. In certain example embodiments, the movement from the two points may be a continuous touch operation along the line indicated by the points 301c. Throughout this process of moving from the position 301b to the position 301d, the user may also maintain the touch position 301a.

Figure 3D:
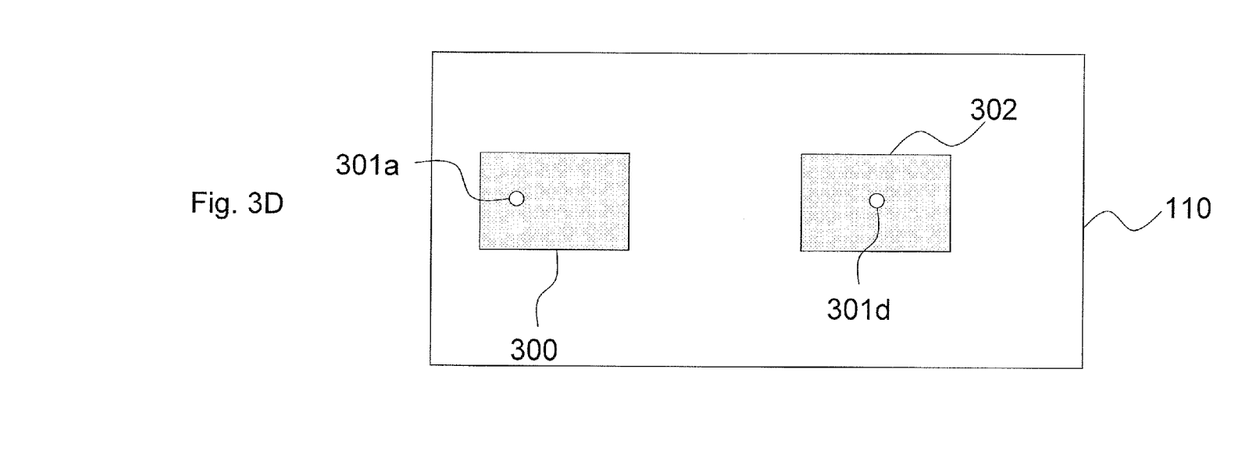

During the touch operation that moves from point 301b to 301d (e.g., via points 301c), a process may be performed to check the distance between point 301a and the "second" touch position. If the system detects that the distance between the two points is greater than a predetermined value, the system may automatically create a duplicate copy 302 of the object 300. Thus, a "dual-touch copy" gesture is performed. In certain example embodiments, the duplicate 302 of the object 300 may be separated by the distance between point 301d and 301a (e.g., as shown in FIG. 3D).

The distance at which the copy process is triggered may be a predetermined and/or user-adjustable distance. Further, the distance may be configurable based on the type of touch screen device being employed. For example, the distance may be a relatively small distance for a smart phone (e.g., because the screen size is small). In such a situation, the distance may be determined by a distance that a person may spread a thumb an index finger on the same hand. For a tablet based device, the distance may be larger. Further, the techniques herein may also be applied to large multi-touch displays (e.g., 1 meter by 1 meter). In such example implementations, the distance may be determined based on how far a user may spread two fingers located on opposing hands. In any event, the distance calculation may be configurable based on the given type of touch screen, devices, or application being executed (e.g., between 1 mm and 2 meters).

After duplication, a user may then individually control the respective objects. In other words, each fingertip that corresponds to a touch position 301a or 301d may advantageously control the position the original and duplicate objects 300, 302. Thus, certain embodiments herein may provide a user a convenient way to duplicate objects on a touch screen.

Figure 4A:
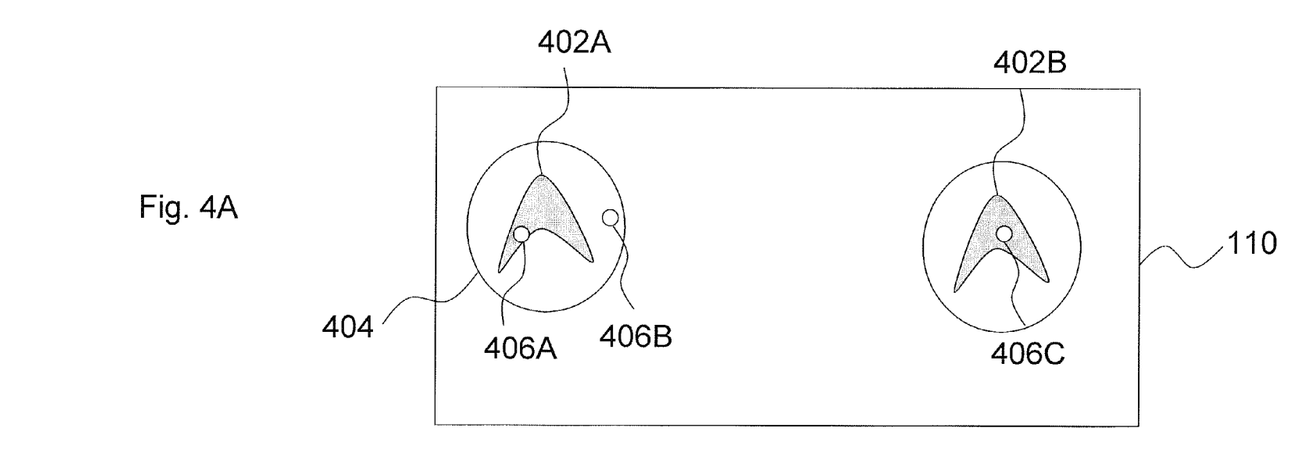
FIGS. 4A and 4B show example selection techniques according to certain example embodiments.

In the examples shown in FIGS. 3A-3D, the selection of an object for duplication may occur when a touch position is detected within an area that the object is occupying on the touch screen 110. In certain instances, the silhouette of the object may be something other than a simple rectangle as shown in FIG. 3A. Indeed, objects displayed as part of a user interface may have many different shapes. FIG. 4A shows an object 402A with a non-standard shape. In such instances, a user may "select" the object by performing a touch operation within a predetermined bounding box or area 404. Thus, touch point 406A may be all or partially over the object 402A, but touch point 406B may be within the bounding area 404, but not over the top of the object 402A. In such instances, the object 402A may still be selected and copied by performing another touch operation to point 406C to create object 402B.

Figure 4B:
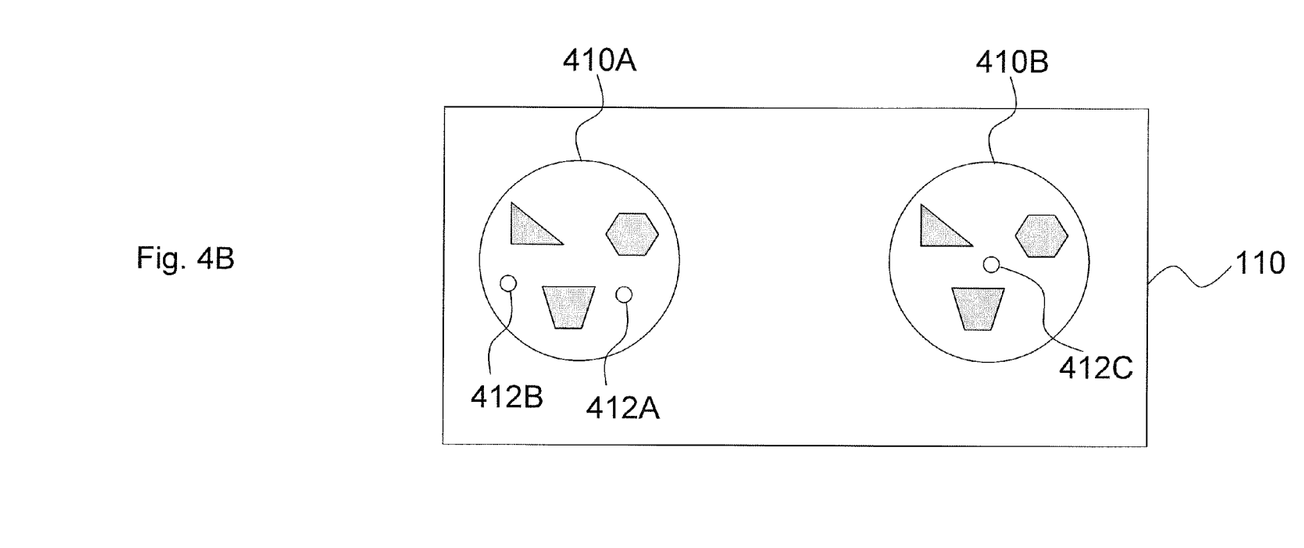

In certain example embodiments, multiple objects may be selected and copied in one operation. In FIG. 4B, the three objects within bounding area 410A are defined as a group object. For example, the user may draw a circle around the objects via the touch screen. This operation may create a new group of objects that may be selected via points 412A and 412B. The objects may be copied as a group to touch point 412C to form duplicate object within area 410B.

Figure 4C:
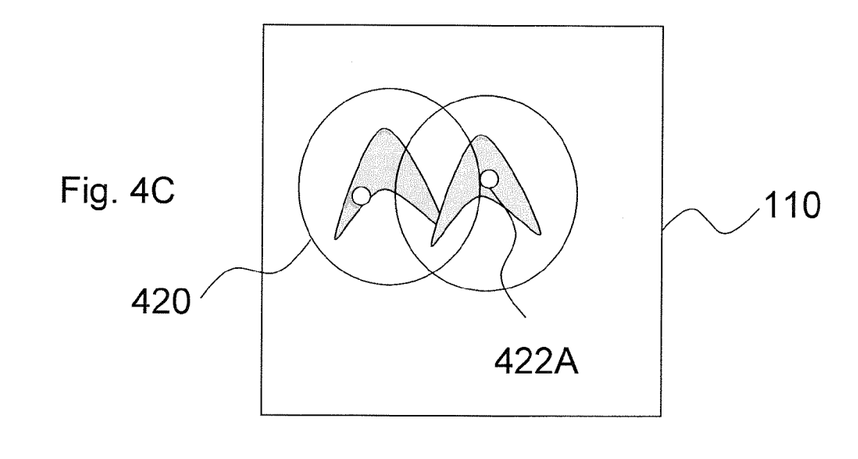
FIGS. 4C and 4D show example duplication tests according to certain example embodiments.

In certain example embodiments, the "trigger" for when a copy operation is implemented may be different than calculating a distance between two touch points. In certain instances, a copy operation may be triggered when a continuous touch operation leaves the bounding area of the object that is being copied. For example, after selecting the object via bounding area 420, in FIG. 4C a touch point 422A is detected as being outside of the bounding area 420. Once this point is detected the object in bounding box 420 may be automatically duplicated (e.g., without extra user interaction or touch commands being performed).

Figure 4D:
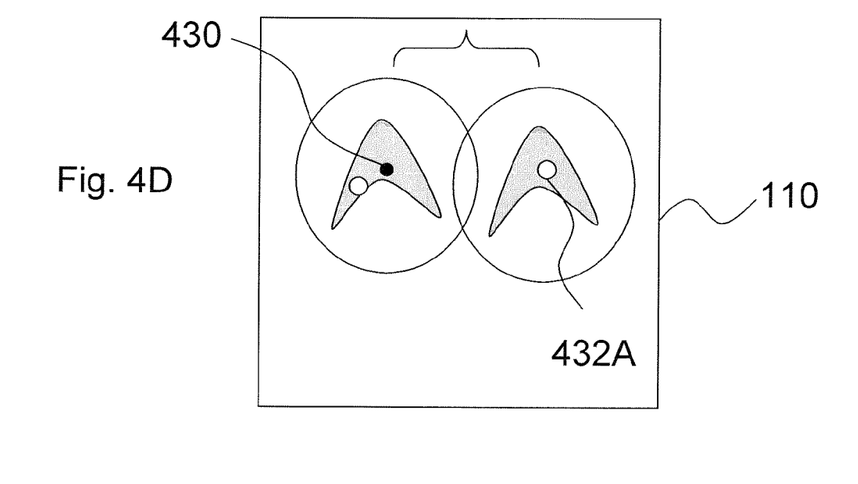

In certain example embodiments, the distance may be calculated from a center point of area bounding area. In FIG. 4D, a distance is calculated between center point 430 and point 432A. Thus, once the calculated distance between the center point 430 and point 432A is greater than a certain amount, the object is duplicated.

In certain example embodiments the distance calculation that is used to trigger a duplication command may be between at least any one of: 1) one or more of the touch points indicated by the user; 2) a point along the bounding area; 3) a point at, or near, the mid-point of the bounding area 4) a point along the edge of the silhouette of the object, and at least any one of: 1) the third touch point; 2) a point along the bounding area of the object that is to be created; 3) a point at, or near, the mid-point of the bounding area of the object that is to be created; 4) a point along the edge of the silhouette of the object that is to be created. For example, the duplication may be triggered when the silhouette of the displayed object no longer overlaps with the object that is to be created (e.g., if the duplicated object were to be created at the third point indicated by the user).

As discussed above, after selecting an object with two touch operations (e.g., at points 301*a* and 301*b*) a user may drag one of the points as part of a continuous touch operation to create a duplicate object. However, in certain example embodiments, a user may select an object with a first finger and second finger (e.g., via two touch points). The user may lift up the second finger while leaving the first finger on the selected object. After releasing the second finger, the user may then touch in a different location on the touch screen with the second finger (or another finger). Based on this new touch position, the duplication techniques described herein may be applied to duplicate the object still indicated by the first finger.

In certain examples, the first finger, continuously indicating the selected object, may also move the selected object around via movement gestures. In other words, by continuously pressing down on the touch screen, the displayed object is linked to the user's finger so long as the touch operation is performed. Thus, if the user moves the finger up in a continuous touch operation the object will likewise move on the display.

In certain example embodiments, the selection of an object or a group of objects may be accomplished via one touch operation (as opposed to two touch operations). For example, a user may perform a touch operation within a bounding area (e.g., bounding area 420). The area and/or the objects therein may be selected after the user maintains a touch operation for longer than a predetermined time period. For example, the predetermined period of time may be 3 seconds. In certain example embodiments, the selection of an object may be done by an ordinary touch operation. Thus, a user may touch one object and then touch another position on a touch screen to trigger a copy operation.

In certain example embodiments, releasing one or more fingers from the touch screen may result in aborting a duplication operation (e.g., if both the second and first fingers are removed from the touch screen).

In certain example embodiments, a bounding area may be invisible or not expressly displayed to a user. For example, bounding area 410A may blend into the background of the overall display. However, upon selection of object(s) or a bounding area with object(s) therein, the display may alter the visual appearance of the bounding area (or the object(s) so that a user is presented with a visual indication of the extent of the bounding area or the nature of what is selected. For example, bounding area 410A may be altered in color, texture, be indented out from the surface of the display (e.g., in a 3-dimensional manner), etc to provide a visual indication of what the user is selecting. In certain example embodiments, the bounding area may be always visible to the user.

Figure 5:
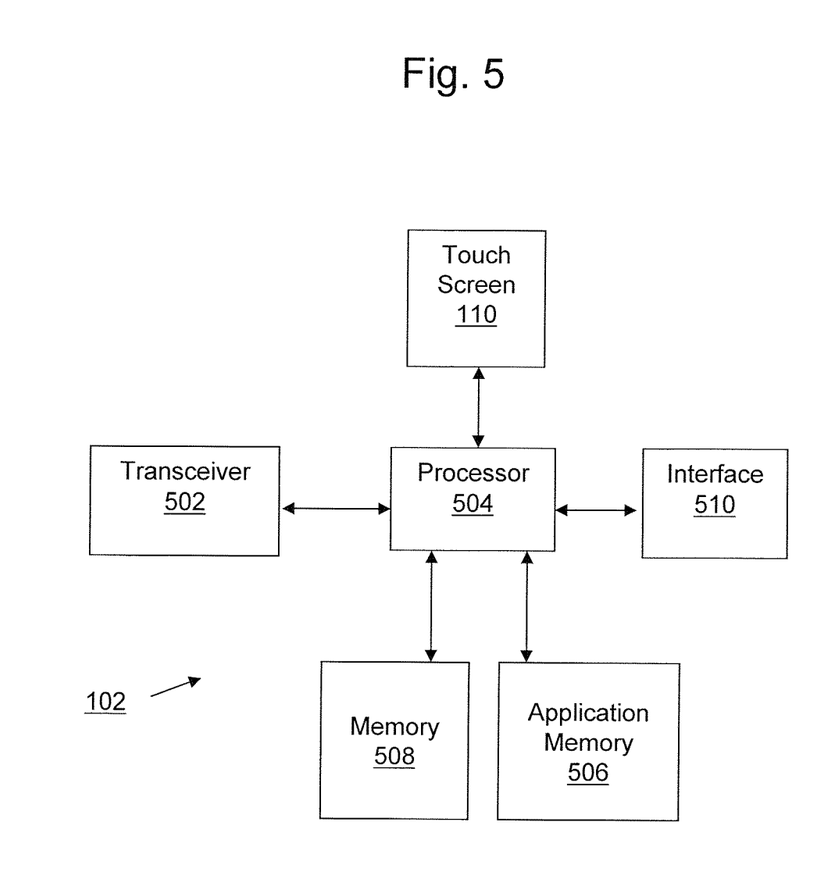
FIG. 5 is a block diagram of an example touch-screen device.

FIG. 5 is a block diagram of an example device 102 according to certain example embodiments. The device may be a smart phone, tablet computer, remote control, touch screen wall display, a desk display, etc. Indeed, virtually any type of device that includes a touch screen may be used according to certain example embodiments. In certain example embodiments, a touch pad may be used with an associated display. For example, the touch pad may be a pad without a coinciding display. Instead, the touch pad may operate and communicate with a separate "normal" no-touch screen display.

The device 102 can include a transceiver 502 that is suitable for exchanging command and other signals with other electronic devices (not shown). In certain example embodiments, the transceiver may be a WiFi enabled network card, a cellular phone transceiver that operates via cellular technology (e.g., CDMA, 3G, and/or 4G technology). It will be appreciated that other types of wired or wireless communications technology may be implemented to allow communication between the device 102 and other remote devices (not shown).

The signals are processed by a suitably programmed electronic processor 504, which may include one or more sub-processors, and which executes one or more software modules and applications to carry out the operations of the device 102 described above. User input to the device 102 is provided through a touch- or proximity-sensitive screen or pad 110, and information can be presented to the user on the screen 110. The touch screen 110 may include, for example, a capacitive touch screen, a resistive type touch screen, infrared detection, optical image recognition, etc. Further, software applications can be stored in a suitable application memory 506, and the device can cache desired information in a suitable memory 508. The device 102 may also include an interface 510 that can be used to connect other components, such as a computer, local or wide area network, etc.

Figure 6:
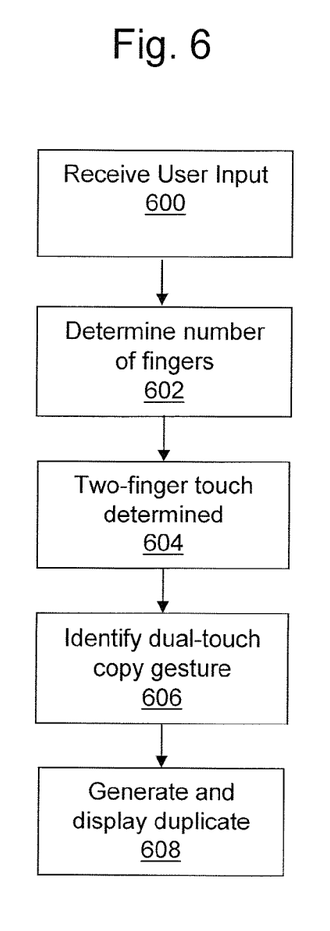
FIG. 6 is an illustrative flow chart showing an example method of controlling a touch-screen device.

A user inputs a gesture on the touch screen 110 that causes the processor 404, using information in the memories 506, 508, to generate appropriate objects, or icons, on the screen 110, for example, to copy such objects. Thus, as depicted in FIG. 6, the processor 504 and memories 506, 508 are configured or programmed to receive input that is a result of a user performing a touch operation on the touch screen 110 and determine (step 602) the number of fingers touching the screen 110.

If the processor determines that the user touches the screen 110 with two fingers (step 604), the processor 504 identifies whether the user has made a dual-touch copy gesture on the screen 110 (step 606). For example, the gesture identification can be based on determining continuous contact of the screen 110 by two fingertips and separation of the fingertips by the distance x within a predetermined time period. Based on an identified dual-touch copy gesture, the processor generates a duplicate of the screen object touched by one of the fingertips, and displays the duplicate on the screen 110 (step 608).

Figure 7:
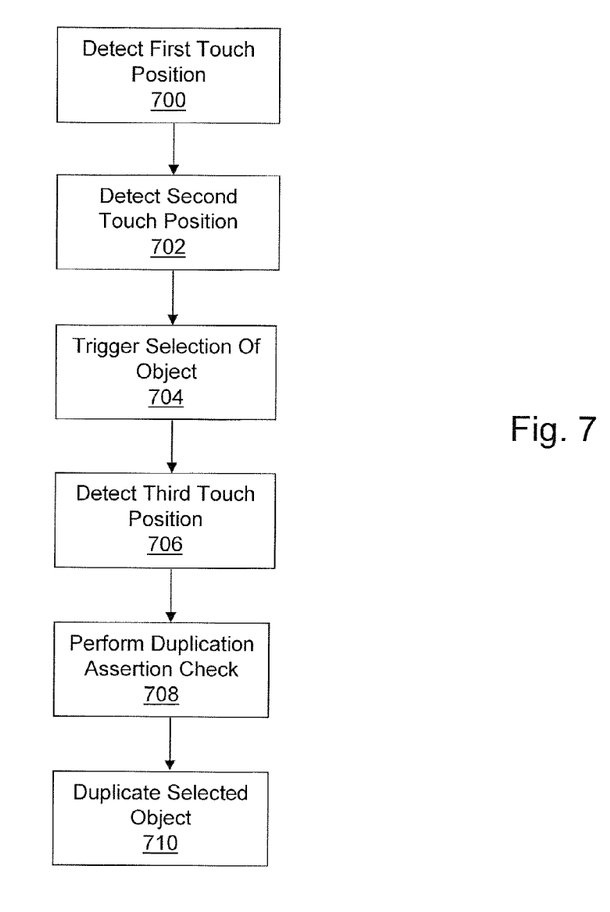
FIG. 7 shows another illustrative flowchart of an example method for performing a gesture control according to certain example embodiments.

FIG. 7 shows a flowchart of an example process for performing a gesture control according to certain example embodiments. A first touch position is detected in step 700 as a result of a user performing a touch operation on a touch screen. While the first touch position is maintained (e.g., the user continues to press on the touch screen), a second position is detected in step 702 as a result of another touch operation from the user (or another user). With both touch positions being maintained, an object displayed on the touch screen is selected in step 704. As discussed above, the touch points may correspond to the displayed body of the object or a bounding area that is maintained by a processing system. In either case, an object is selected as a result of the two touch positions.

After selection of the object via the two touch positions, the system detects a third touch position in step 706. In certain example embodiments, the first and second positions may be maintained when the third position is detected. However, in a preferred embodiment, the third position is a result of a continuous touch operation performed between the second (or first) position and the third position.

Based on the detected third position, a check is performed in step 708 to see if the selected object should be duplicated. As discussed above, this may be accomplished via a distance calculation, a position calculation of the third touch, etc. If the check is successful the object is duplicated in step 710.

In certain example embodiments, the computer file or object is duplicated in system memory in addition to displaying another copy of the object. In certain example embodiments, another copy is not created in system memory, but rather only a new image of the document or file is displayed (e.g., via a pointer from the original file).

It will be appreciated that procedures described above are carried out repetitively as necessary, for example, to respond to user actions. Devices implementing this invention can be included in, for example, computers, servers, media players, mobile devices, smart phones, tablet computers, laptop computers, computing devices that include a touch pad or a touch screen enabled display, and the like.

The embodiments herein are described in terms of sequences of actions that can be performed by, for example, elements of a programmable computer system. It will be recognized that various actions could be performed by specialized circuits (e.g., discrete logic gates interconnected to perform a specialized function or application-specific integrated circuits), by program instructions executed by one or more processors, or by a combination of both.

Moreover, the example embodiments herein can additionally be considered to be embodied entirely within any form of computer-readable storage medium having stored therein an appropriate set of instructions for use by or in connection with an instruction-execution system, apparatus, or device, such as a computer-based system, processor-containing system, or other system that can fetch instructions from a medium and execute the instructions. As used here, a "computer-readable medium" can be any means that can contain, store, or transport the program for use by or in connection with the instruction-execution system, apparatus, or device. The computer-readable medium can be, for example but not limited to, an electronic, magnetic, optical, electromagnetic, infrared, or semiconductor system, apparatus, or device. More specific examples (a non-exhaustive list) of the computer-readable medium include an electrical connection having one or more wires, a portable computer diskette, a random-access memory (RAM), a read-only memory (ROM), and an erasable programmable read-only memory (EPROM or Flash memory).

Thus, the invention may be embodied in many different forms, not all of which are described above, and all such forms are contemplated to be within the scope of the claims.

It is emphasized that the terms "comprises" and "comprising", when used in this application, specify the presence of stated features, integers, steps, or components and do not preclude the presence or addition of one or more other features, integers, steps, components, or groups thereof.

None of the above description should be read as implying that any particular element, step, range, or function is essential such that it must be included in the claims scope. The scope of patented subject matter is defined only by the claims. The extent of legal protection is defined by the words recited in the allowed claims and their equivalents. All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology described, for it to be encompassed by the present claims. No claim is intended to invoke 35 U.S.C. §112, $6^{th}$ paragraph unless the words "means for" or "step for" are used. Furthermore, no embodiment, feature, component, or step in this specification is intended to be dedicated to the public regardless of whether the embodiment, feature, component, or step is recited in the claims.

The particular embodiments described above are merely illustrative and should not be considered restrictive in any way. The scope of the invention is determined by the claims, and all variations and equivalents that fall within the range of the claims are intended to be embraced therein.

The invention claimed is:

1. A computer implemented method performed on a processing system that includes at least one processor, the processing system coupled to a memory, the processing system coupled to a touch screen display, the method comprising:
    displaying a first object on the touch screen display;
    detecting a first touch input on the touch screen at a first position within an area that is associated with the first object;
    detecting a second touch input on the touch screen within the area at a second position that is different from the first position;
    detecting a third touch input on the touch screen at a third position after detecting the first and second touch inputs, the third position being different from the second position;
    determining a distance between the third position and the first position; and
    displaying a copy of the first object on the touch screen enabled display as a result of determining that the distance is greater than a predetermined value,
    wherein the second touch input and the third touch inputs are included in a continuous touch input connecting at least the second and third positions,
    wherein the detected first touch input is not included as part of the continuous touch input between at least the second and third positions.

2. The method of claim 1, wherein the first touch input is detected before the second touch input, or the second touch input is detected before the first touch input.

3. The method of claim 1, wherein the first and second touch inputs are substantially simultaneously detected.

4. The method of claim 1, wherein the copy is displayed at or proximate to the third position on the touch screen display.

5. The method of claim 1, wherein the first object includes a plurality of objects and the area that is associated with the first object encompasses the plurality of objects.

6. A non-transitory, computer-readable storage medium storing computer readable instructions for use with a computing system that includes at least one processor, the computing system including a display that is associated with a touch screen and a memory that is operatively coupled to the at least one processor, the stored instructions comprising instructions that are configured to:
    display at least one object on the touch screen display;

detect a first touch input on the touch screen at a first position within an area that is associated with the at least one object;

detect a second touch input on the touch screen within the area at a second position that is different from the first position;

detect a third touch input on the touch screen at a third position after detecting the first and second touch inputs, the third position being different from the second position;

perform a test using a duplication criteria to determine if a distance between the third position and a detected position of the first touch input is greater than a distance threshold value; and display a copy of the at least one object on the touch screen display as a result of the test being successful, wherein the third touch input is detected while the first touch input is still detected at the detected position.

7. The medium of claim 6, wherein the duplication criteria includes the third position being outside the area that is associated with the at least one object.

8. The medium of claim 7, wherein the duplication criteria further includes a distance between a position within the area associated with the at least one object and the third position, the position not including the first and/or second position.

9. The medium of claim 6, wherein the second touch input and the third touch input includes a contiguous touch input therebetween along the touch screen display.

10. The medium of claim 6, wherein the at least one object includes a plurality of objects and the area that is associated with the at least one object encompasses the plurality of objects.

11. The medium of claim 6, wherein the first and second touch inputs are substantially, simultaneously detected.

12. An apparatus comprising:

a touch screen display;

a processing system that includes at least one processor, the processing system configured to:

display an object on the touch screen display;

detect a first touch input on the touch screen display at a first position that is within an area that is associated with the object;

detect a second touch input on the touch screen display within the area at a second position that is different from the first position;

detect a third touch input on the touch screen at a third position after detecting the second touch input, the third position being different from the second position;

calculate a distance between the third position and the first position;

duplicate the object if the calculated distance is greater than or equal to a predetermined value; and display the duplicated object on the touch screen display, wherein the second touch operation and the third touch operation are part of a contiguous touch operation between at least the second and third positions, wherein the detected first touch input is not included as part of the contiguous touch operation between the second and third positions.

13. The apparatus of claim 12, wherein the displayed duplicated object is displayed on the touch screen display proximate to the third position.

14. The apparatus of claim 12, wherein the predetermined value is not greater than a distance between a thumb and index finger of a user of the apparatus.

15. The apparatus of claim 12, wherein the second touch operation and the third touch operation are part of a contiguous touch operation between the second and third positions on the touch screen display.

16. The apparatus of claim 12, wherein the object includes a plurality of objects and the area encompasses the plurality of objects.

* * * * *